United States Patent [19]

Craner

[11] Patent Number: 4,790,611
[45] Date of Patent: Dec. 13, 1988

[54] ADJUSTABLE WORK SURFACE

[76] Inventor: Steven F. Craner, 3190 S. 4140 West, West Valley City, Utah 84120

[21] Appl. No.: 919,797

[22] Filed: Oct. 16, 1986

[51] Int. Cl.[4] .............................................. A47B 57/00
[52] U.S. Cl. ..................................... 312/306; 312/29; 108/147
[58] Field of Search ..................... 312/306, 24, 27, 25, 312/28, 30, 29, 312, 350; 49/347; 108/106, 144, 148, 147; 211/209; 248/123.1, 157, 364; 254/387

[56] References Cited

U.S. PATENT DOCUMENTS

| 126,380 | 5/1872 | Culver | 292/256.73 |
| 757,807 | 4/1904 | Hazard | 108/147 |

FOREIGN PATENT DOCUMENTS 2254825  5/1974  Fed. Rep. of Germany ...... 312/306
119513   9/1918  United Kingdom ................ 312/27

Primary Examiner—Kenneth J. Dorner
Assistant Examiner—Gerald A. Anderson
Attorney, Agent, or Firm—Andrew C. Hess

[57] ABSTRACT

The invention relates to mechanisms for adjusting the height of horizontal surfaces, particularly adjustable work surfaces. One application of the invention is an adjustable computer work station for physically impaired individuals. The adjustable work surface comprises a work surface, a lever arm having a first end that is in association with the work surface and a second end that is pivotly fixed such that when the lever arm pivots from a substantially horizontal position to a substantially vertical position the vertical position of the work surface changes, an adjusting means for pivoting the lever arm, and a stabilizing means for retaining the work surface in a substantially horizontal position.

3 Claims, 2 Drawing Sheets

ADJUSTABLE WORK SURFACE

BACKGROUND OF THE INVENTION

1. Field

The invention relates to mechanisms for adjusting the height of horizontal surfaces, particularly adjustable work surfaces. One application of the invention is an adjustable computer work station for physically impaired individuals.

2. State of the Art

Adjustable work surfaces have generally been known for many years. In recent years, with the development of the computer industry, adjustable work surfaces have been designed to accommodate computer equipment. Since computer equipment is relatively expensive, the same equipment is often used by several individuals. To reduce stress and increase productivity, adjustable work surfaces are desirable which allow workers to use the computer equipment comfortably over long periods of time. Prior configurations have been specifically designed for use in the office or other every day work space by physically unimpaired workers.

Existing mechanisms for adjusting horizontal surfaces are generally illustrated by the adjustable Work surfaces, adjustable furniture, adjustable word processing tables and the like taught by U.S. Pat. No. 301,304 issued July 1, 1884 to Teal; U.S. Pat. No. 2,713,520 issued July 19, 1955 to Greene; U.S. Pat. No. 3,304,892 issued Feb. 21, 1967 to Bengtson; U.S. Pat. No. 4,440,096 issued Apr. 3, 1984 to Rice. et al.; and U.S. Pat. No. 4,566,741 issued Jan. 28, 1986 to Eriksson, et al.

Typically, adjustable horizontal surfaces for furniture or computer work stations are adjusted by driving an elongated screw mechanism or a hydraulic piston mechanism to change the elevation or the angle of the work surface. Most furniture or computer work stations presently available are adjustable in the vertical direction over a limited range. The computer work stations are also extremely compact to take up a limited amount of expensive floor space in an office, and are usually designed only to accommodate physically unimpaired individuals.

SUMMARY OF THE INVENTION

Objectives

In the making of the invention, it was an objective to provide an adjustable work surface which could be adjusted over a large range, and which would have a simple mechanism which would allow for ease of operation, low cost of production and easy and low cost maintenance. Another objective of the invention was to provide an adjustable work surface which was particularly adapted for use by physically impaired individuals. Another objective of the invention was to provide an adjustable work surface that was particularly adapted for computer equipment such that the work surface provides for easy access by physically impaired individuals to all components of the computer equipment, and additionally accommodates special computer components designed specifically for use by physically impaired individuals. A further objective of the invention was to provide a adjustable work surface that is extremely stable and would be able to support a large amount of weight. A final objective of the invention was to provide an adjustable work surface that accommodates physically impaired individuals, but is easily moved from room to room throughout a building which normally accommodates physically unimpaired persons.

Features

In the accomplishment of the foregoing objectives of the invention, the adjustable work surface comprises a work surface, a lever arm having a first end that is in association with the work surface and a second end that is pivotally fixed such that when the lever arm pivots from a substantially horizontal position to a substantially vertical position the vertical position of the work surface changes, an adjusting means for pivoting the lever arm and a stabilizing means for retaining the work surface in a substantially horizontal position.

Preferably the work surface is of sufficient dimension to accommodate computer equipment, particularly the components of a personal computer system, such as the CRT, printer disk drives, keyboard and CPU. Additionally, there should be space on the work surface for special computer component which have been developed for physically impaired persons. Preferably the work station is divided into three levels: an upper shelf to support those peripherals such as the CRT and printer which should be supported at eye level; a middle shelf, which is of the largest dimension to support the CPU, keyboard and disk drives; and a lower shelf designed to accommodate a touch keyboard suitable for physically impaired individuals.

The lever arm is preferably of sufficient length to allow for adjustment of the height of the work surface over a large range. It is preferred that the first end of the lever arm which is in association with the work surface contact the bottom side of the work surface, and that the second end of the lever arm be positioned such that the pivot point is below the work surface such that when the lever arm is pivoted from a substantially horizontal position to a substantially vertical position, the lever arm pushes on the bottom side of the work surface and elevates the work surface. It is preferred that the second end of the lever arm be pivotly fixed to a base. The base may be the stabilizing means. Although one lever arm is sufficient for the operation of the invention, it is preferred that there be a plurality of lever arms to add stability and support to the work surface and load thereon.

Preferably, the adjusting means associated with the lever arm allows for easy and continuous adjustment of the lever arms from a horizontal position to a vertical position. If a plurality of lever arms are utilized, it is preferable that the adjusting means be designed such that all lever arms are adjusted simultaneously through a single adjustment control. The preferred adjusting means is a cable having one end of the cable attached to the lever arm and the other end of the cable attached to a hand crank which, when the crank is turned, will draw in or release the cable thereby moving the lever arm. Pulleys may be used to conveniently route the cable from the lever arm to the hand crank.

The stabilizing means for retaining the work surface in a substantially horizontal position is preferably a plurality of substantially vertical tracks mounted to a solid surface. The edges of the work surface are slideably attached to the tracks such that the work surface slides easily in a vertical direction along the tracks. The tracks are positioned around the work surface in a configuration which retains the work surface in a substantially horizontal position.

THE DRAWINGS

The general inventive concepts of the invention as well as the best mode presently contemplated for carrying out the invention are shown in the accompanying drawings in which:

FIG. 1 is a cut-away perspective view of the adjustable work surface illustrating the inventive concepts;

FIG. 2, a vertical section taken on line 2—2 of FIG. 1, FIG. 2 also depicts the action of the adjustable work surface as shown by the broken line figure;

FIG. 3 is a perspective view of the adjustable work surface as particularly adapted to a computer work station for physically impaired individuals;

FIG. 4, a vertical section taken along line 4—4 of FIG. 3;

FIG. 5, a vertical section taken along line 5—5 of FIG. 3, FIG. 5 also depicts a retractable work surface of the lower shelf in its extended position as shown by the broken line figure.

DETAILED DESCRIPTION OF THE ILLUSTRATED EMBODIMENTS

Figure 1:
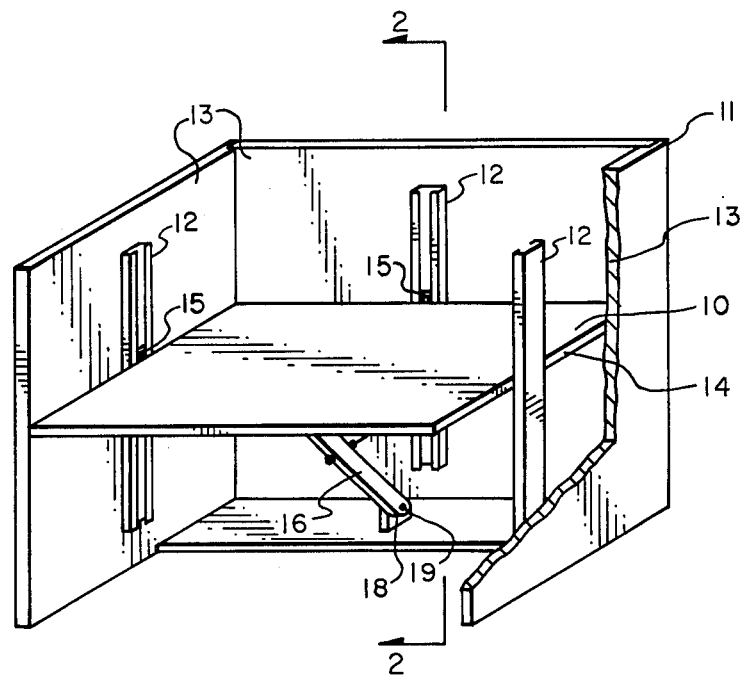
Figure 2:
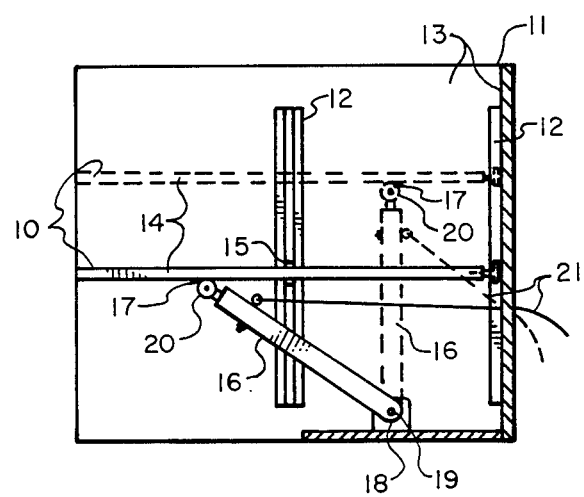

FIGS. 1 and 2 illustrate the general inventive concepts of the adjustable work surface according to the invention. The adjustable work surface includes a work surface (10). A stabilizing mean (11) retains the work surface in a substantially horizontal position. The stabilizing means is preferably a solid surface to which the work is slidably mounted. Preferably, the stabilizing means comprises a plurality of vertical tracks (12) which are fixed to stable vertical surfaces (13). The tracks (12) are attached to the edges (14) of the work surface (10) by slides (15) housed within the tracks (12) which allow for vertical movement of the work surface (10) along the tracks (12) The tracks (12) are positioned around the work surface (10) such that the work surface (10) is retained in a substantially horizontal position.

A lever arm (16) is used to adjust the vertical position of the work surface (10). Although one lever arm will suffice to adjust the work surface, often it is preferable to have a plurality of lever arms depending on the size and shape of the work surface and the amount of weight it supports. A first end (17) of the lever arm 16) is associated with the work surface (10). and a second end (18) of the lever arm (16) is mounted on a pivot point (19) such that when the lever arm 16) pivots from a substantially horizontal position to a substantially vertical position, the vertical position of the work surface changes. Preferably, the pivot point (19) is located below the work surface and the first end (17) of the lever arm (16) contacts the bottom side of the work surface (10). It is also preferable that the pivot point be attached to a base. The base may be integral with the stabilizing means. Preferably the first end (17) of the lever arm (16) is a roller (20) to allow for easy movement of the first end (17) of the lever ar (16) along the bottom of the work surface (10).

An adjusting means is associated with the lever arm (16) for adjusting the position of the lever arm (16) about the pivot point (19). Although the adjusting means may be chosen from a number of mechanical, hydraulic or electro-mechanical mechanisms designed to adjust the position of the lever arm, the adjusting means is preferably a cable (21) which is attached to the lever arm (16) which may be retracted or released, and locked in to any position between a fully retracted and a fully released position.

Referring to FIG. 2, the solid-line figure indicates the position of the work surface (10) when the lever arm (16) is in a substantially horizontal position. The broken-line figure indicates the position of the work surface (10) when the lever arm (16) is in a substantially vertical position. The solid-line figure and the broken-line figure depict the general vertical movement of the adjustable work surface as taught by the invention.

Figure 3:
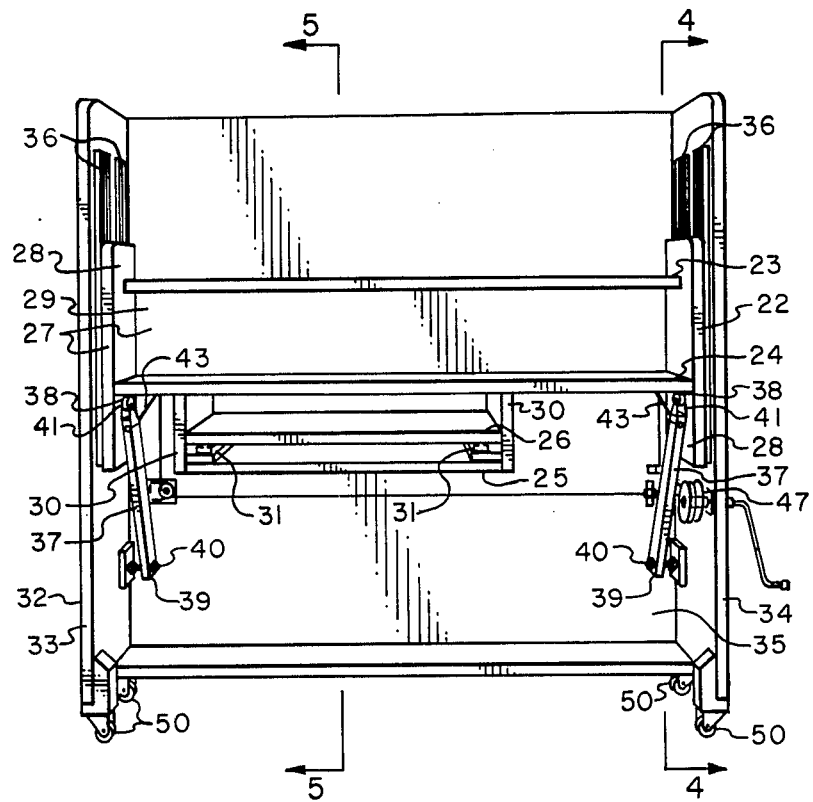
Figure 4:
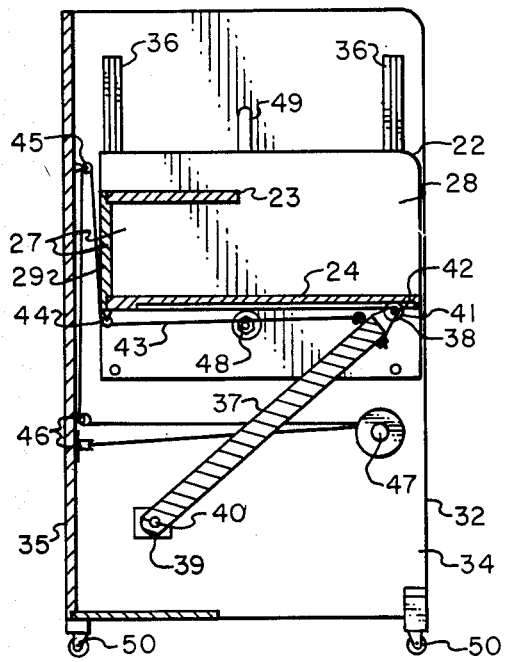
Figure 5:
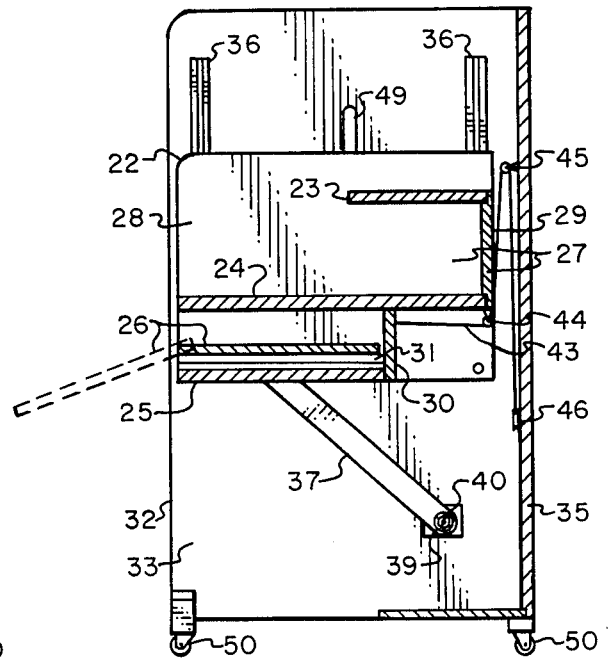

FIGS. 3, 4 and 5 illustrate a preferred embodiment of the adjustable work surface according to the invention as adapted particularly to a computer work station for physically impaired individuals. This embodiment includes a work surface (22) designed to support computer equipment. Preferably the work surface has a multiplicity of shelves to accommodate a personal computer and accompanying peripherals: an upper shelf (23), a middle shelf (24) and a lower shelf (25). The upper shelf (23) is positioned above the middle shelf (24), and the lower shelf (25) is positioned below the middle shelf (24).

The middle shelf (24) is the largest work surface and should be of sufficient dimension to support a CPU, keyboard and disk drives. The upper shelf (23) is recessed sufficiently to allow easy access to the keyboard but yet of sufficient dimension Lo support a CRT, printer and other peripherals which should be at eye level of the computer operator. The distance between the middle shelf (24) and upper shelf (23) should be large enough to allow the peripherals supported by the middle shelf (24) to be tucked under the upper shelf (23). The lower shelf (25) is substantially smaller than the middle shelf (24), but should be of sufficient size to house a computer touch pad or other computer peripherals specifically adapted for use by physically impaired persons. The lower shelf (25) utilizes a retractable work surface (26) which may be extended and tilted.

The middle shelf (24) and upper shelf (25) are supported relative to each other by a plurality of support members (27). Preferably the support members (27) are attached to the edges of the middle shelf (24) and upper shelf (23) and positioned to form two sides (28) and a back (29) which partially surround the middle shelf (24 and upper shelf (23). It is preferable that the back (29) not extend above the upper shelf (25) to allow for routing power and control cables and computer paper. The lower shelf (25) may also be attached to the support members (27), but is preferably suspended below the middle shelf (24) by suspension members (30). The suspension members (30) preferably attach to three edges of the lower shelf to form three sides around the lower shelf (25) and attach to the underside of the middle shelf (24). The retractable work surface (26) rides on support tracks (31) which are attached to the lower shelf (25). The support tracks (31) may also be attached to the suspension members (30). The support tracks (31) are preferably model number C-1313 eighteen inch flipper door guides available from Accuride 12311 South Shoemaker Avenue. Santa Fe Springs, Calif. 90670

The work surface (22) is associated with a stabilizing means that supports the work surface (22) in a substantially horizontal position. In this embodiment, the preferred stabilizing means is an outer cabinet (32) having a left side (33), and a right side 34) and a back (35) which partially surround the work surface 22). Attached to the inside surface of the outer cabinet (32) are a plurality of vertical tracks (36) which house sliding mechanisms. The sliding mechanisms are attached to the outer surfaces of the support members (27). The vertical tracks

(36) are positioned on the inside surface of the outer cabinet (32) such as to retain the work surface (22) in a substantially horizontal position and allow for vertical movement of the work surface (22). It is also preferred that the work surface (22) be positioned such that there is approximately two and one half inches between the back of the work surface (22) and the back (35) of the outer cabinet (32) so that the power and control cables do not bind when the work surface (22) is adjusted. The vertical tracks (36) and sliding mechanisms are preferably model number 30-029-565 Quadro 40HF 450 m.m. drawer slides which are available from Hettich America Corporation, 12428 Sam Neely Road, Charlotte, N.C. 28210. The work surface (22) and outer cabinet (32) are preferably constructed of wood or wood composites. and are assembled by using rabbet joint and dado joint cabinet making techniques.

Vertical movement of the work surface (22) is achieved by movement of a lever arm. Preferably a plurality of lever arms (37) are positioned such that a first end (38) of each of the lever arms (37) is in association with the work surface (22) and a second end (39) of each of the lever arms (37) is pivotly attached to pivot points (40). Preferably the lever arms (37) are positioned such that the pivot points (40) are below the work surface (22) and the first ends (38) of the lever arms (37) contact the bottom side of the middle shelf (24). When the lever arms (37) are moved from a substantially horizontal position to a substantially vertical position, the work surface (22) changes vertical position. Preferably the first ends (38) of the lever arms (37) which are in contact with the work surface (22) are rollers (41) which roll in recessed notches (42) imbedded in the bottom side of the middle shelf (24). The rollers (41) are preferably model number 600-FH sliding door hangers available from E-Z Roll Manufacturing, Co. a division of Aluma Trim, Inc., New York. Alternatively, the first ends of the lever arms may be slidably attached to the work surface. Preferably, the first ends of the lever arms are slidably attached to the bottom of the middle shelf by a track housing a slide, with the track attached to the bottom of the middle shelf and the slide attached to the first ends of the lever arms. It is also preferable that the pivot points be mounted to a base. The pivot points may also be mounted to the stabilizing means.

An adjusting means is attache to the lever arm for pivoting the lever arm. Preferably the adjusting means comprises a flexible member and at least two low friction means wherein the flexible member is attached to the lever arm which then passes a first low friction means located near an edge of the work surface and then passes a second low friction means mounted above the first low friction means such that the work surface changes in vertical position when the flexible member is drawn to change the position of the lever arm. Preferably the flexible member and low friction means are arrangement for each of the lever arms (37) consisting of a cable (43) which is attached to the first end (38) of one of the lever arm (37) which then runs through a first pulley (44) located at the edge of the work surface (22) and then loops through a second pulley (45) mounted above the highest vertical position of the work surface such that the work surface changes in vertical position when the cables are drawn through the first pulley and second pulley and change the position of.the lever arm. Preferably the second pulley (45) is mounted to the inside of the back (35) of the outer cabinet (32 at a point which is higher than the highest point to which the work surface (22) is elevated . Preferably the flexible member is attached to a cranking means such that when the cranking means is operated the flexible member moves the lever arm. As illustrated in the drawings, the cable (43) is then threaded through a plurality of pulleys (46) such that the cable (43) is directed to the cranking means (47) around which the cable (43) may be wound. Preferably the cranking means (47) locks to prevent the uncontrolled release of the cable (43) and is continually adjustable. If a plurality of lever arms are utilized, the cables for adjusting the lever arms (37) are preferably wound upon the same cranking means (47 so that when the crank is turned the lever arms (37) are adjusted simultaneously to uniformly adjust the vertical position of the work surface (22). The cranking means (47) is preferably model number 100 roller lift awning crank available from the Astrup, Co., P.O. Box 535, Edison, N.J. 08818. A retention means for holding the first end (38) of the lever arms 37) in contact with the work surface (22) when the adjusting means is released may be associated with the lever arms (37). The preferred retention means may be a spring or a slidable attachment of the lever arms to the work surface.

For additional security and safety, a locking means may be associated with the adjustable work surface to secure the work surface (22) into a particular position after adjustment by the adjusting means. In the preferred embodiment, the locking means consist of a bolt (48) which is attached to the work surface (22) and which protrudes outward through the outer cabinet, preferably through a vertical slot (49) in the outer cabinet (32). The work surface (22) may be secured into position by tightening a wing nut against the cabinet (32). This embodiment may also be mounted on casters (50) to allow for ease of movement.

Referring to FIG. 5, the solid-line figure depicts the retractable work surface (26) in the retracted position. The broken-line figure depicts the retractable work surface (26) in the extended and tilted position. Together the solid-line figure and broken-line figure indicate the general movement of the retractable work surface (26).

Generally, this embodiment of the adjustable work surface is constructed of an overall dimension to easily accommodate a wheelchair or other apparatus used by physically impaired individuals. Preferably this embodiment is also of small enough dimension for easy movement throughout the interior of a conventionally constructed building.

Whereas, this invention is here illustrated and described with specific reference to an embodiment thereof presently contemplated as the best mode in carrying out such invention in actual practice, it is to be understood that the various changes may be made in adapting the invention to different embodiments without departing from the broader invent of concepts disclosed herein and comprehended by the claims that follow.

I claim:

1. An adjustable work surface comprising:
    (a) a work surface having a bottom side, a top side, and edges,
    (b) at least one lever arm which has a first end that is in association with the work surface and a second end that is pivotly fixed such that when the lever arm pivots from a substantially horizontal position to a substantially vertical position the work surface changes in vertical position, (c) an adjusting means for pivoting the lever arm having a flexible member and at least two low friction means wherein the flexible member is attached to the lever arm which then passes a first low friction means located near an edge of the work surface and then passes a second low friction means mounted above the first low friction means such that the work surface changes in vertical position when the flexible member is drawn to change the position of the lever arm, (d) a stabilizing means for retaining the work surface in a substantially horizontal position, and (e) a cranking means attached to the flexible member such that when the cranking means is operated the flexible member moves the lever arm.

2. An adjustable work surface as recited in claim 1 wherein the second low friction means is also mounted above the highest vertical position of the work surface.

3. An adjustable work surface as recited in claim 2 wherein:
 (a) the flexible member is a cable, and
 (b) the first low friction means and second low friction means are a first pulley and a second pulley, respectively.

* * * * *